United States Patent [19]

Wagner

[11] Patent Number: 5,036,784
[45] Date of Patent: Aug. 6, 1991

[54] BOAT MOORING APPARATUS

[76] Inventor: Steven G. Wagner, 737 Tacoma Crescent, Kingston, Ontario, Canada, K7M 5C5

[21] Appl. No.: 524,575

[22] Filed: May 16, 1990

[30] Foreign Application Priority Data

May 2, 1990 [CA] Canada ................................. 2015972

[51] Int. Cl.⁵ ............................................. B63B 59/02
[52] U.S. Cl. ..................................... 114/219; 114/230
[58] Field of Search ................................ 114/219, 230; 405/212–215; 14/76

[56] References Cited

U.S. PATENT DOCUMENTS

| 3,464,214 | 9/1969 | King ..................................... 114/230 |
| 3,695,209 | 10/1972 | Giese ................................... 114/230 |
| 3,842,779 | 10/1974 | Jaynes ................................. 114/230 |
| 4,773,349 | 9/1988 | McKinney ........................... 114/219 |

OTHER PUBLICATIONS

"Annual Graduation Exhibition 1989", School of Industrial Design, Carleton University, Apr. 28–30.

*Primary Examiner*—Ed Swinehart
*Attorney, Agent, or Firm*—Samuel Meerkreebs

[57] ABSTRACT

A boat mooring apparatus which includes a pair of identical boat frames adapted to be mounted on the edge of a dock with straps extending between the ends of each respective boat frame, under tension. A quick release device is provided on the frame for slackening the straps to allow the boat to be brought closer to the dock for boarding. The boat can be moored by means of lines brought against the snubbing apparatus which keeps the boat spaced from the dock to avoid unnecessary damage thereto.

9 Claims, 3 Drawing Sheets

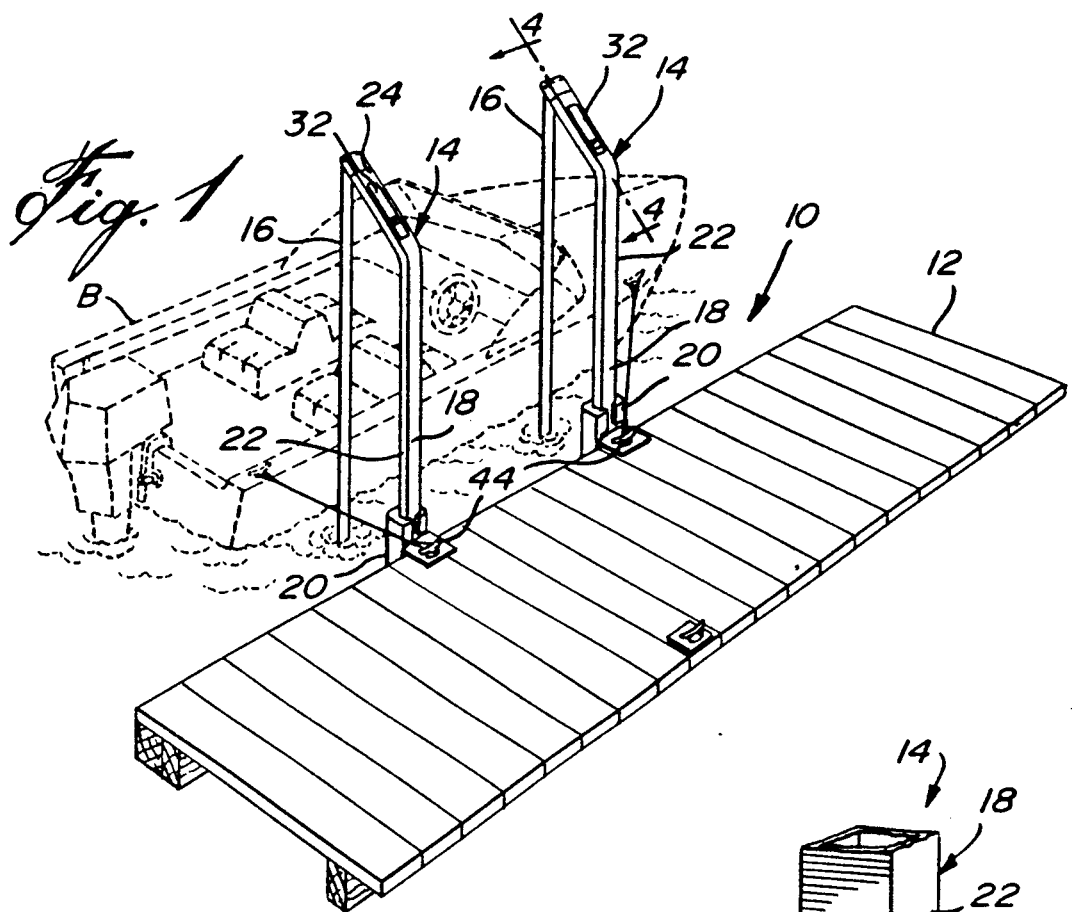
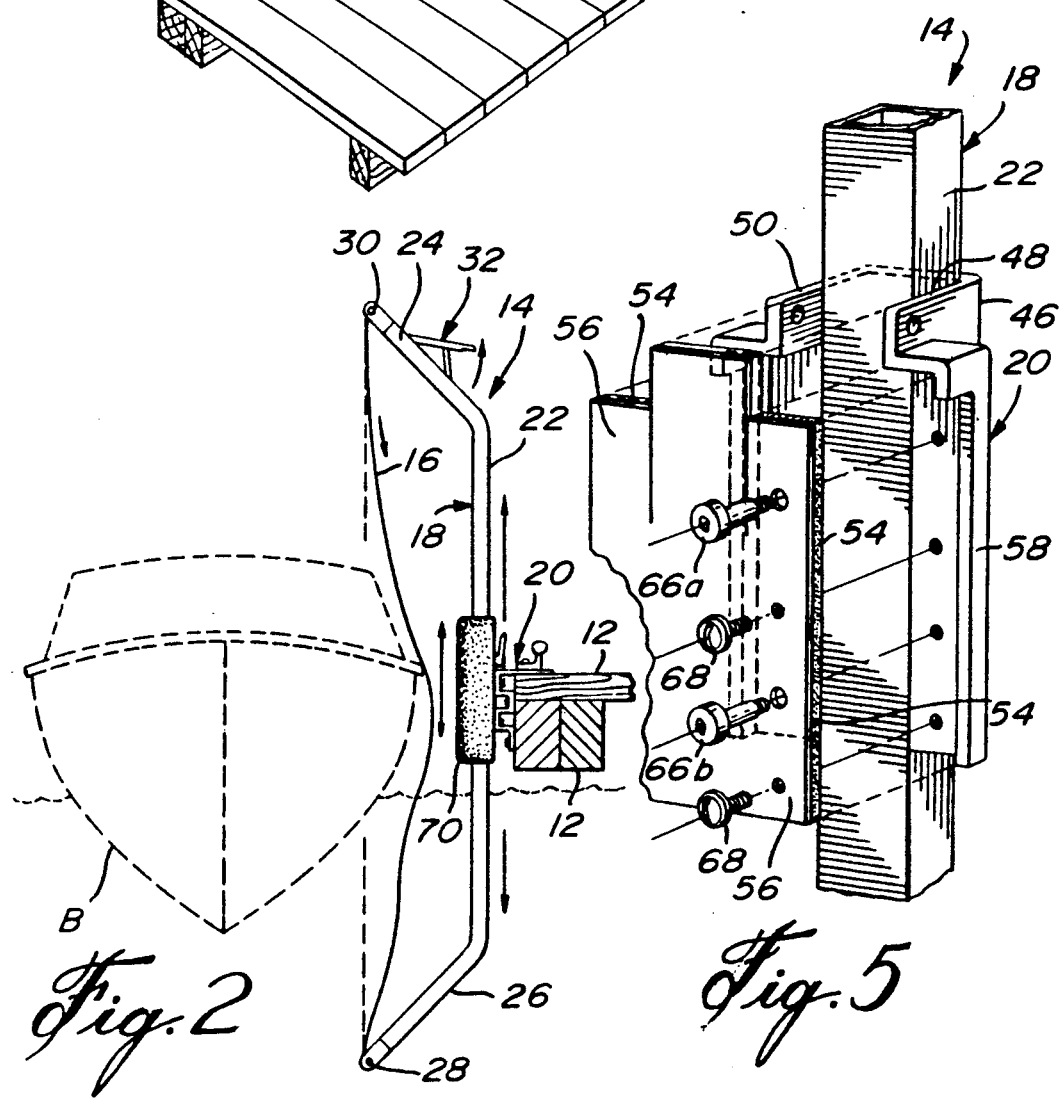

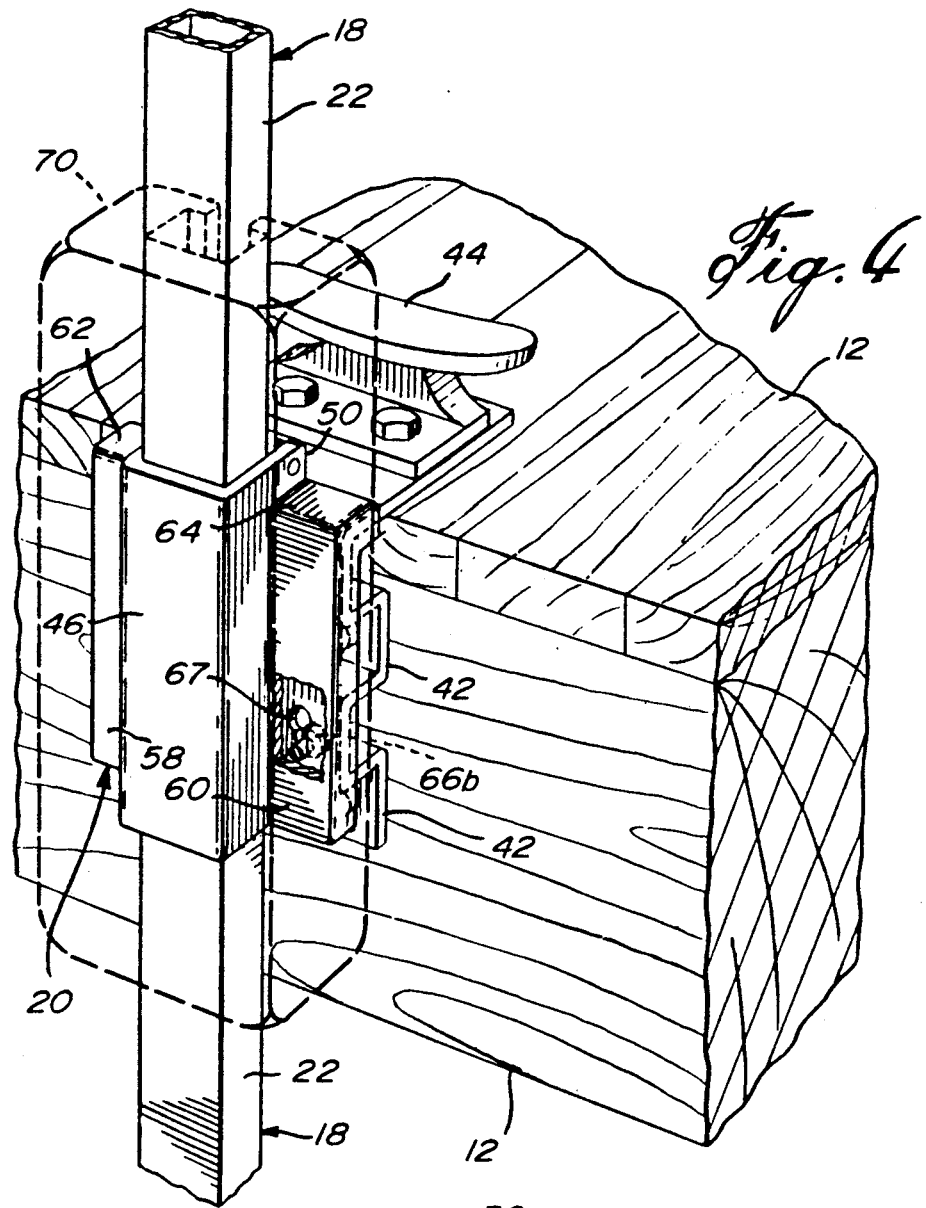
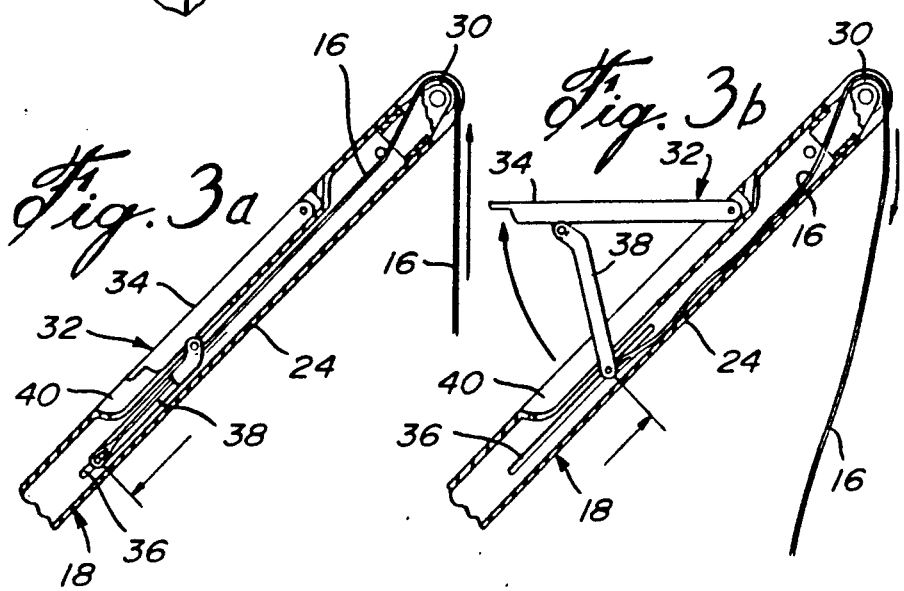

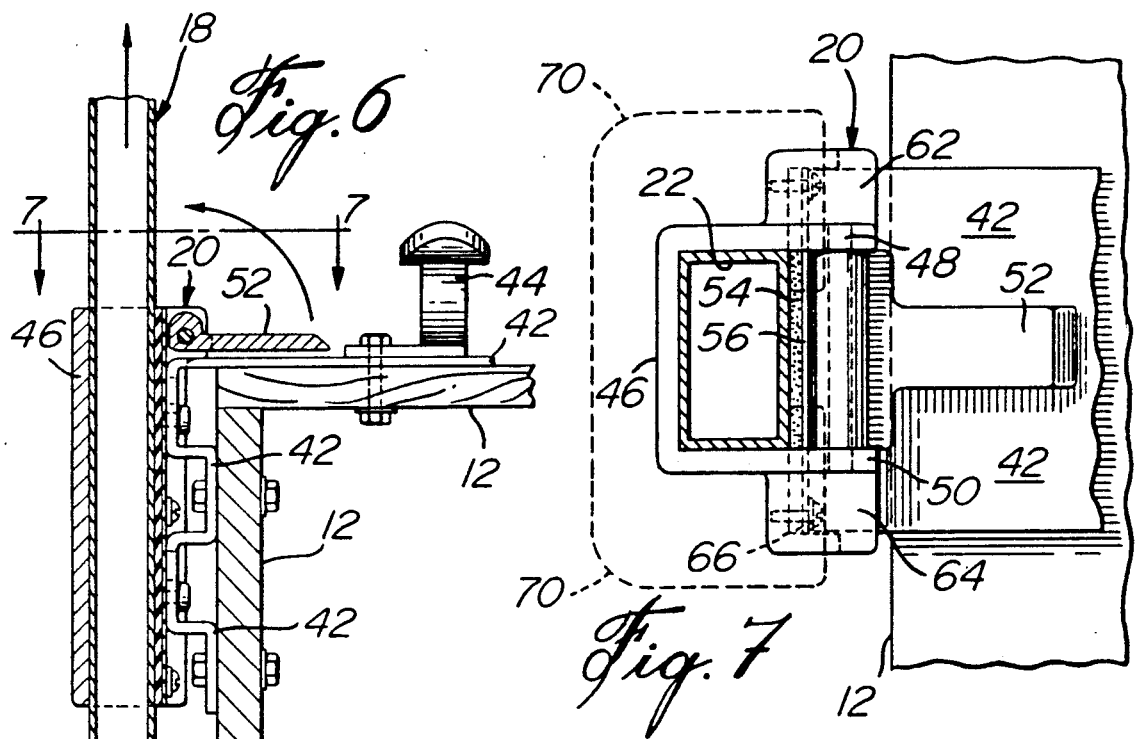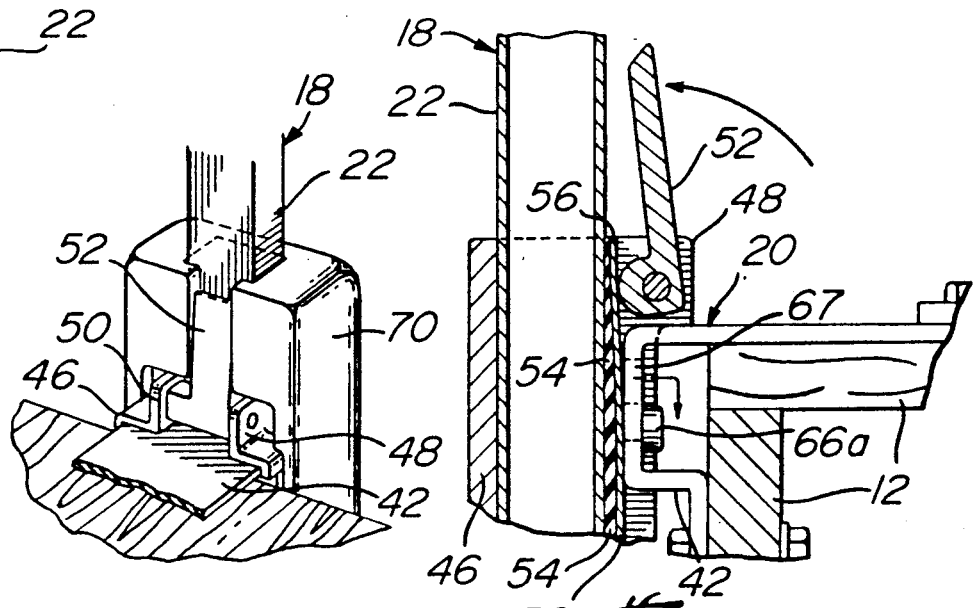

BOAT MOORING APPARATUS

BACKGROUND OF THE INVENTION

1. Field of the Invention

The present invention relates to a boat mooring apparatus, and more particularly, to an improved mooring system with a snubbing device which can hold a boat away from a dock against its mooring lines in order to avoid damage to the boat or dock.

2. Description of the Prior Art

There are presently different systems to provide a shock absorbing interface between a small pleasure boat and a dock when the boat is moored to the dock. The most common of these devices is to provide fenders of resilient material on the side of the dock where it is anticipated the boat will be moored. Many boats in the 20-foot to 40-foot range carry their own portable fenders for use when being moored to a dock. Such fenders are usually stored on board when not in use. A whip type mooring device has also been developed which includes at least a pair of fiberglass, bowed, flexible poles mounted to the dock, with the free ends connected to the bow and stern of the boat, thus retaining the boat near but spaced from the dock, and allowing vertical movement in reaction to the waves, etc.

U.S. Pat. Nos. 3,464,214, King, issued Sept. 2, 1969, and 3,842,779, Jaynes, issued Oct. 22, 1974, are good examples of a mooring system using a snubbing device. Both patents show a pair of bowed frame members mounted to a dock, with a cable under tension between respective ends of each bow. The boat is maintained, spaced from the dock by these snubbers, and the tensioned cables absorb most lateral shocks while allowing the boat to ride up and down in a vertical plane.

The problem with these devices, including the whip mooring system and the bowed snubbing devices, is that the boat is held spaced from the dock making it difficult to board.

SUMMARY OF THE INVENTION

It is an aim of the present invention to provide an improved mooring apparatus which overcomes the disadvantages of the prior art.

It is a further aim of the present invention to provide a mooring device which includes a snubbing device that distances the boat from the dock but which allows the boat to be drawn to the dock for boarding.

A mooring apparatus in accordance with the present invention comprises a plurality of snubbing frame members to be mounted on a dock for spacing a boat away from the dock when it is being moored. Each of the snubbing frame members has an intermediate portion with bowed end portions in the same direction and in the same plane away from the dock, and a flexible elongated member extends between the end portions of each frame member. Mooring means are provided for mooring a boat against the flexible elongated members of respective snubbing frame members whereby the boat will be maintained spaced from the dock by the snubbing frame members. Release means are provided for releasing the reactive pressure of the snubbing frame members against the so-moored boat to allow the boat to be drawn to the dock for boarding.

A construction in accordance with a more specific embodiment of the present invention comprises a plurality of frame members, each having an elongated intermediate portion and a pair of end portions each having a free end and each bowed from the axis of the intermediate portion in the same direction and in the same plane. A flexible elongated member extends between the free ends of the frame member under tension, and quick release means are associated with the flexible member whereby the tension in the flexible elongated member can be released and applied when required.

In a more specific embodiment, mounting means are provided for securing each frame to a dock at the edge thereof, and the mounting means includes a clamp adapted to selectively and fixedly engage the intermediate portion of the frame member.

In yet a more specific embodiment, the flexible member passes over one of the free ends and is attached to a quick release member mounted to the frame member whereby the tension can be released and applied.

BRIEF DESCRIPTION OF THE DRAWINGS

Having thus generally described the nature of the invention, reference will now be made to the accompanying drawings, showing by way of illustration, a preferred embodiment thereof, and in which:

FIG. 1 is a perspective view of an embodiment of the present invention;

FIG. 2 is a side elevation showing the present invention in an operative position;

FIGS. 3a and 3b are fragmentary longitudinal cross-section views of a detail of the present invention showing different operative positions;

FIG. 4 is an enlarged perspective view of a detail of the present invention;

FIG. 5 is a perspective exploded view of the detail shown in FIG. 4;

FIG. 6 is a fragmentary vertical cross-section of the detail shown in FIG. 4;

FIG. 7 is a horizontal cross-section taken along line 7—7 of FIG. 6;

FIG. 8 is an enlarged fragmentary cross-section of the detail shown in FIG. 6 but in a different operative position; and FIG. 9 is a perspective view of the detail shown in FIG. 4 from a different angle.

DESCRIPTION OF THE PREFERRED EMBODIMENTS

Referring now to FIGS. 1 and 2, there is shown an embodiment of a snubbing mooring system 10 of the present invention. In FIG. 1, for instance, there is illustrated a pair of snubbing frames 14 mounted to a dock 12 against which a boat B can be moored. The snubbing frame 14, as shown in FIGS. 1 and 2, includes a frame member 18 having a linear intermediate portion 22 with a pair of angled portions 24 and 26 extending away from each other from the ends of the intermediate portion 22 but in the same plane as portion 22. The frame member 18 in the present embodiment has a hollow rectangular cross-section, as shown in FIG. 7.

An anchor pin 28 is provided on the end of the end portion 26 to which the strap 16 is anchored. In the present embodiment, and as shown in FIGS. 2 and 3a and 3b, the strap, which is preferably made of a fabric web, passes over the roller 30 and is connected to the quick release device 32 provided in the end portion 24. Instead of a roller, a convexly curved end member can be substituted.

As shown in FIGS. 3a and 3b, the quick release device 32 includes a lever 34 pivoted to the frame portion 24 within a recess 40. Slots 36 are provided in the wall of the frame portion 24, and a link member 38 is pivoted at one end to the lever 34, and the other end travels in the slot 36. The strap 16 is anchored to the other end of the link member 38. In order to keep the strap 16 under tension, the lever 34 is closed within the recess 40, as shown in FIG. 3a. In order to quickly release the strap 16, the lever 34 is rotated clockwise, as shown in FIG. 3b.

In operation, as shown in FIGS. 1 and 2, the straps 16 are normally retained under tension extending in the bow formed by the frame member 18. A pair of snubbing frames 18 would normally be sufficient for mooring a small pleasure craft. The boat B would be moored by attaching lines to the cleats 44 on the dock 12 with the side of the boat adjacent the straps 16 on the respective frame members 18. In such a manner, the boat will be safely held spaced from the dock to avoid damage in the event of strong wave action or wind. When it is required to board the boat, the quick release devices 32 will be activated so that the straps 16 are immediately slackened, allowing the boat B to be brought close to the dock, at which time it can be boarded. If it is required that the lines mooring the boat be kept taut, the lines can be attached to the cleats 44 when the straps 16 are loose. Once the lines have been made fast, the straps 16 can be tensioned by means of the quick release levers 34. However, the lines are not normally kept taut but merely to their full extent.

The mounting of the snubbing frames 14 is illustrated in FIGS. 4 through 9. As shown in the embodiment of FIGS. 4 to 9, a mounting bracket 42 is fastened to the side and top of the dock 12. In this case, the mounting bracket 42 has a corrugated or double channel shape configuration on the side portion thereof. The bracket 20 includes a releasable sleeve 46. The sleeve 46 includes a pair of ears 48 and 50 extending inwardly of the intermediate portion 22 of the frame member 18 and a pair of flanges 58 and 60. A cam lever 52 is mounted between the ears 48 and 50. A resilient pad 54 extends along the surface of the intermediate portion 22 facing the cam lever 52, and a cover plate 56 extends over the resilient pad 54 and is bolted to flanges 58 and 60 by means of screws 68. Thus, the cover plate 56 holds the resilient pad against the inner surface of the intermediate portion 22 of frame 18.

The cam lever 52 acts against a portion of the cover plate 56 to press against the resilient pad 54 which in turn clamps the intermediate portion 22 of frame member 18 against and within the sleeve 46. The lever 52 is released when in a horizontal position, as shown in FIG. 6, such that the intermediate portion 22 of the frame member 18 can be adjusted vertically. Once the lever 52 has been rotated counterclockwise to the position shown in FIG. 8, the intermediate portion 22 will be fixed within the sleeve 46, thereby preventing any further vertical adjustment.

Pairs of bolts 68a and 68b having heads spaced from the cover plate 56 are provided on the flanges 58 and 60 of the sleeve 46. These bolt heads are adapted to enter and lock into key holes 67 provided in the mounting bracket 42. Thus, when it is required to remove the snubbing frames 14 for dock storage, the brackets 20 and frame members 18 are lifted and removed from the mounting brackets 42 and vice versa.

A bumper pad 70 is shown in the present drawings as being a molded member made of a relatively rigid but shock absorbing material, such as a closed cellular polyurethane material. Preferably, the bumper pad is a blow-molded member. As shown in the drawings, particularly in FIGS. 1 and 2, the bumper 70 is fitted by snapping it over the bracket 20 which, therefore, covers the various sharp angles of the bracket 20 which could otherwise damage a boat when the straps 16 have been loosened. The bumper 70 also is coincident with the height of the dock 12.

Only a single embodiment has been illustrated in the drawings. Many modifications could be made to the embodiment shown herein without affecting the scope of the claims. For instance, the quick release 32 for the straps 16 could be a different construction; for instance, the frame members 14 could be themselves hinged so that they collapse to slacken the straps 16. In order to provide tension to the straps, the frame members can be locked in their erect position.

Different constructions of the bracket 20 are contemplated to allow the frame members 18 to be adjusted vertically and to be mounted to the mounting plates 42. For instance, instead of a camming lever 52, a series of openings can be provided in the intermediate portion 22 to receive a locking pin passing through the sleeve 46.

It is also contemplated that the bowed frames 14 will act as hand rails for persons boarding or getting out of the boat.

I claim:

1. A snubbing mooring apparatus to be mounted on a dock comprising a plurality of snubbing frame members, each having an elongated intermediate portion and a pair of end portions with each end portion having a free end and each end portion bowed from the axis fo the intermediate portion in the same direction and in the same plane, a flexible elongated member extendign between the free ends of the frame member under tension, an over-center lever locking device mounted on one of the end portions of the frame members, and the flexible member passes over the free end of the one of the end portions and is attached to the lever member.

2. A mooring apparatus as defined in claim 1, wherein the elongated flexible member is a fabric webbing in the form of a strap.

3. A snubbing mooring apparatus to be mounted on a dock comprising at least one snubbing frame member, said frame member having an elongated intermediate portion and a pair of end portions with each end portion having a free end and each end portion bowed from the axis of the intermediate portion in the same direction and in the same plane, a flexible elongated member extending between the free ends of the end portions, a releasable tension means associated with the flexible elongated member for reducing the length of the flexible member between the free ends of the end members, in a first position, whereby the flexible member will be under tension and a second position wherein the tension is released and the flexible member is lengthened between the free ends allowing the flexible member to be deflected inwardly towards the intermediate portion.

4. A mooring apparatus as defined in claim 3, wherein mooring means is provided for mooring a boat against the flexible elongated member of the snubbing frame member, whereby, when the flexible elongated member is in the first position, the boat will be maintained spaced from the dock by the snubbing frame member, and when it is required to draw the boat to the dock, the releasable tension means will operate to the second position releasing the tension in the flexible elongated member, allowing the flexible elongated member to be extended and deflected towards the intermediate portion of the frame at the dock.

5. A mooring apparatus as defined in claim 3, wherein bracket means is provided for releasably mounting the frame member to a dock, said frame member and the bracket means having adjustment means for adjusting the vertical height of the frame member relative to the bracket means and thus to the dock.

6. A mooring apparatus as defined in claim 5, wherein the bracket for releasably mounting the frame member to a dock includes a mounting member fixedly mounted to the dock, a sleeve member through which the intermediate portion of the frame member can slide, locking means for locking the bracket relativ eto the intermediate portion of the frame member, and anchor means on the sleeve member for engaging the mounting bracket on the dock.

7. A mooring apparatus as defined in claim 6, wherein a bumper member is mounted on the bracket means in order to avoid damage when the flexible member is slackened.

8. A mooring apparatus as defined in claim 3, wherein the releasable tension means includes an overcenter lever locking device mounted on one of the end portions of the frame member, and the flexible member passes over the free end of the one end portion of the frame and is attached to the lever member.

9. A mooring apparatus as defined in claim 8, wherein the elongated flexible member is a fabric webbing in the form of a strap.

* * * * *